(12) United States Patent
Monroe et al.

(10) Patent No.: US 7,518,120 B2
(45) Date of Patent: Apr. 14, 2009

(54) LONG-DISTANCE QUANTUM COMMUNICATION AND SCALABLE QUANTUM COMPUTATION

(75) Inventors: Christopher Monroe, Dexter, MI (US); Boris Blinov, Seattle, WA (US); David Moehring, Ann Arbor, MI (US); Luming Duan, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 641 days.

(21) Appl. No.: 11/324,366

(22) Filed: Jan. 3, 2006

(65) Prior Publication Data

US 2006/0249670 A1    Nov. 9, 2006

Related U.S. Application Data

(60) Provisional application No. 60/641,324, filed on Jan. 4, 2005.

(51) Int. Cl.
  *H04B 10/02* (2006.01)
  *G06F 15/00* (2006.01)
(52) U.S. Cl. .................. 250/393; 250/395; 398/173; 398/183; 712/1
(58) Field of Classification Search ............. 250/393, 250/395; 398/173, 183; 712/1
  See application file for complete search history.

(56) References Cited

U.S. PATENT DOCUMENTS 7,126,691 B2 * 10/2006 Gat ....................... 356/450

2004/0264958 A1    12/2004 Zoller et al.

OTHER PUBLICATIONS

Matsukevich et al, "Quantum State Transfer Between Matter and Light", Science, vol. 306, pp. 663-666, Oct. 2004.
Blinov et al, "Observation fo entanglement between a single trapped atom and a single photon", Nature, vol. 428, pp. 153-157, Mar. 2004.
Duan et al, "Scalable Trapped Ion Quantum Computation with a Probabilistic Ion-Photon Mapping", http://arxiv.org, quant-ph/0401020, pp. 1-6, Jan. 2004.
Duan et al, "Scalable Trapped Ion Quantum Computation with a Probabilistic Ion-Photon Mapping", Quantum Information and Computation, vol. 4, No. 3, pp. 165-173, 2004.
Garcia-Ripoll et at, "Speed Optimized Two-Qubit Gates with Laser Coherent Control Techniques for Ion Trap . . . ", Phys. Rev. Lett., vol. 91, No. 15, pp. 157901-1-4, Oct. 2003.
Kuzmich et al, "Generation of nonclassical photon pairs for scalable quantum communication with atomic ensembles", Nature, vol. 423, pp. 731-734, Jun. 2003.

(Continued)

*Primary Examiner*—Evan Pert
(74) *Attorney, Agent, or Firm*—Harness, Dickey & Pierce, P.L.C.

(57) ABSTRACT

Methods and apparatus for long-distance quantum communication and scalable quantum computation are disclosed. The methods and apparatus are based on probabilistic ion-photon mapping. Scalable quantum computation is achieved by forming deterministic quantum gates between remotely located trapped ions by detecting spontaneously emitted photons, accompanied by local Coulomb interaction between neighboring ions. Long-distance quantum communication and scalable quantum communication networks formed by employing a number of remote nodes that each include an ion trap and by employing probabilistic photon-mediated entanglement between the ions in each ion trap.

16 Claims, 9 Drawing Sheets

OTHER PUBLICATIONS

Duan et al, "Efficient Engineering of Multiatom Entanglement through Single-Photon Detections", Phys.Rev.Lett.,vol. 90,No. 25, pp. 253601-1-4, Jun. 2003.

van der Wal et al, "Atomic Memory for Correlated Photon States", Science, vol. 301, pp. 196-200, Jul. 2003.

Leibfried et al, "Experimental demonstration of a robust, high-fidelity geometric two ion-qubit phase gate", Nature, vol. 422, pp. 412-415, Mar. 2003.

Schmidt-Kaler et al, Realization of the Cirac-Zoller controlled-NOT quantum gate , Nature, vol. 422, pp. 408-411, Mar. 2003.

Monroe, "Quantum information processing with atoms and photons", Nature, vol. 416, pp. 238-246, Mar. 2002.

Duan et al, "Long-distance quantum communication with atomic ensembles and linear optics", Nature, vol. 414, pp. 414-418, Nov. 2001.

Milburn et al, "Ion Trap Quantum Computing with Warm Ions", Fortschr. Phys., vol. 48, No. 9-11, pp. 801-810, 2000.

Sackett et al, "Experimental entanglement of four particles", Nature, vol. 404, pp. 256-259, Mar. 2000.

Sorensen et al, "Quantum Computation with Ions in Thermal Motion", vol. 82, No. 9, pp. 1971-1974, Mar. 1999.

Briegel, "Quantum Repeaters: The Role of Imperfect Local Operations in Quantum Communication", Phys.Rev.Lett.,vol. 81, No. 26, pp. 5932-5935, Dec. 1998.

Monroe et al, "Demonstration of a Fundamental Quantum Logic Gate", Phys.Rev.Lett., vol. 75, No. 25, pp. 4714-4717, Dec. 1995.

Cirac et al, "Quantum Computations with Cold Trapped Ions", Phys. Rev.Lett., vol. 74, No. 20, pp. 4091-4094, May 1995.

Jefferts et al, "Coaxial-resonator-driven rf (Paul) trap for strong confinement", Phys. Rev. A, vol. 51, No. 4, pp. 3112-3116, Apr. 1995.

Cabrillo et al, "Creation of entangled states of distant atoms by interference", Phys.Rev. A, vol. 59, No. 2, pp. 1025-1033, Feb. 1999.

Blatt et al, "Quantum jumps in atomic systems", Eur. J. Phys., vol. 9, pp. 250-256, 1988.

* cited by examiner

LONG-DISTANCE QUANTUM COMMUNICATION AND SCALABLE QUANTUM COMPUTATION

CROSS-REFERENCE TO RELATED APPLICATIONS

This application claims the benefit of U.S. Provisional Application No. 60/641,324, filed on Jan. 4, 2005. The disclosure of the above application is incorporated herein by reference.

STATEMENT OF GOVERNMENTAL SUPPORT

This invention was made with Government support under Grant No. DAAD 19-01-1-0667 awarded by the Army Research Office and Grant No. 0245609 awarded by the National Science Foundation ITR. The Government has certain rights in this invention.

FIELD

The present disclosure relates to the apparatus and methods for scalable quantum computation and for long-distance communication, each based on probabilistic ion-photon mapping.

BACKGROUND

The statements in this section merely provide background information related to the present disclosure and may not constitute prior art.

One of the obstacles of long-distance quantum communication is that the degree of entanglement generated between two distant quantum systems coupled by photonic channels decreases exponentially with the length of the connecting channel due to optical absorption and noise in the channel. Exponential decay of entanglement as a function of channel length requires an exponentially increasing number of partially entangled states to obtain one highly entangled state. Similar problems exist in the proposals of scalable quantum computing. As an example, trapped ions constitute one of the most promising systems for implementing a quantum computer. It appears unlikely, however, that this system can be scaled by simply adding ions to a single trap due to the growing complexity of the vibrational mode spectrum and the inefficiency of laser cooling of the collective motion of a large ion crystal to near the ground state.

To overcome the problems of scalability of quantum computing and long-distance communication, the idea of using quantum repeaters has been proposed. A key aspect of quantum communication involves using quantum repeaters to divide a long communication channel into a sufficiently large number of short segments of length $L_0$ that are less than the attenuation length $L_{at}$. Information is then transferred between adjacent segments via entanglement swapping.

Unfortunately, the proposals for quantum repeaters are ostensibly theoretical and do not address the practical aspects of implementing quantum repeaters in a manner suitable for a commercially viable quantum computer or long-distance communication system.

SUMMARY

One aspect of the present teachings provides for entanglement generation between two or more remotely located pairs of trapped ions or atoms.

Another aspect of the present teachings provides for entanglement generation between multiple remotely located pairs of trapped ions or atoms.

Another aspect of the present teachings provides for scalable quantum computation based on local gate operations and probabilistic ion-photon mapping.

Another aspect of the present teachings provides long distance quantum communication in which resources scale polynomially with transmission distance.

Another aspect of the present teachings is a method of creating entanglement between remotely located ions. The method includes trapping logic and ancilla ion pairs (i.e., one logic ion and one ancilla ion constitute a pair) in respective first and second remote ion traps, entangling the logic and ancilla ions in each trap, and causing the ancilla ions in each ion trap to emit photons. The method also includes interfering and detecting the emitted photons to establish entanglement between the logic ions of the first and second ion traps.

Another aspect of the present teachings is a method of forming a quantum register. The method includes providing two or more optically coupled ion traps that each contains a pair of ions, with one ion serving as a logical qubit and the other ion serving as an ancilla qubit, and optically exciting the ancilla qubits in adjacent traps. The method further includes interfering and detecting spontaneously emitted light from the excited ancilla qubits to cause the logical qubits in the adjacent ion traps to become entangled. The method also optionally includes repeating the above acts for adjacent ion traps in sequence, and making a Bell measurement of the ancilla qubits in the intermediate traps so as to cause entanglement between logic qubits in traps at respective ends of the intermediate traps.

Another aspect of the present teachings is a method of establishing entanglement between ions in a quantum network. The method includes preparing trapped logic and ancilla ions in a ground state in each of a plurality of optically coupled remote ion traps in the network, and entangling the logic and ancilla ions in a first one of the ion traps by applying a local motional CNOT gate. The method also includes performing a probabilistic photon-mediated entanglement protocol using the ancilla ions to establish entanglement between the logic ions in the first ion trap and an adjacent second ion trap in the network.

Another aspect of the present teachings is a long-distance quantum network system. The system includes a number of remotely located nodes, including a first and a last node, with each node containing an ion trap that contains a pair of trapped logic and ancilla ions. The nodes are separated by a distance less than an attenuation length of photons emitted by the trapped ions. Each ion trap is optically coupled to: a) a laser cooling and optical pumping system adapted to prepare the ions in each trap in a ground state of a common vibrational mode, b) a technical block adapted to excite the ancilla ions, c) an optical detection system adapted to interfere and detect photons emitted by excited ancilla ions from adjacent ion traps, and d) a modulator unit adapted to provide light pulses to the logic ion, or the both the logic ion and the ancilla ion, in order to form single-qubit gates or local two-qubit gates at the corresponding ion trap.

Further areas of applicability will become apparent from the description provided herein. It should be understood that the description and specific examples are intended for purposes of illustration only and are not intended to limit the scope of the present disclosure.

DRAWINGS

The drawings are for illustration purposes only and are not intended to limit the scope of the present disclosure in any way.

Figure 1:
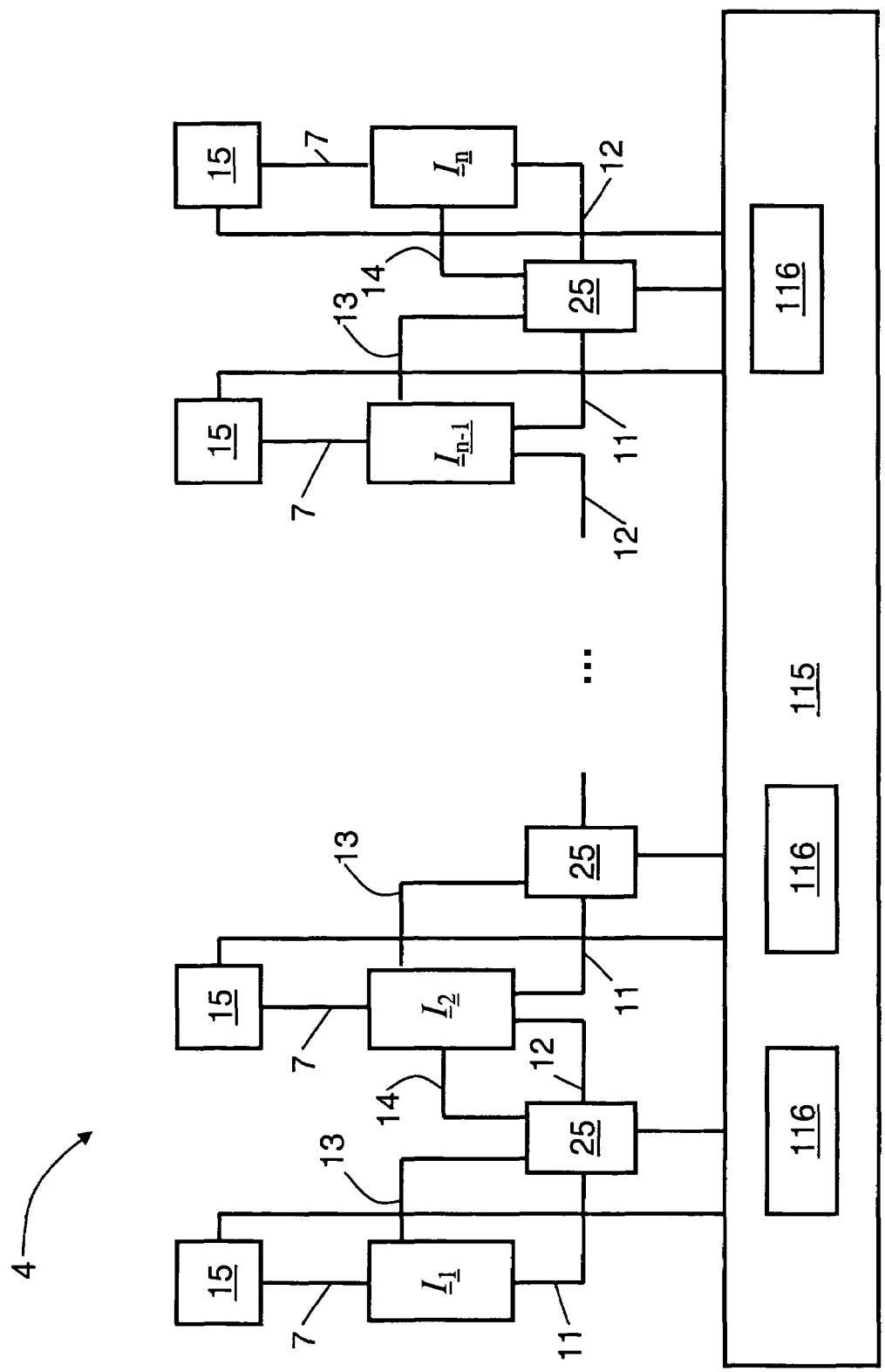
FIG. 1 is a schematic diagram of an example embodiment of a quantum computing apparatus that performs quantum computation using probabilistic photon-mediated entanglement between remote ions.
Figure 7:
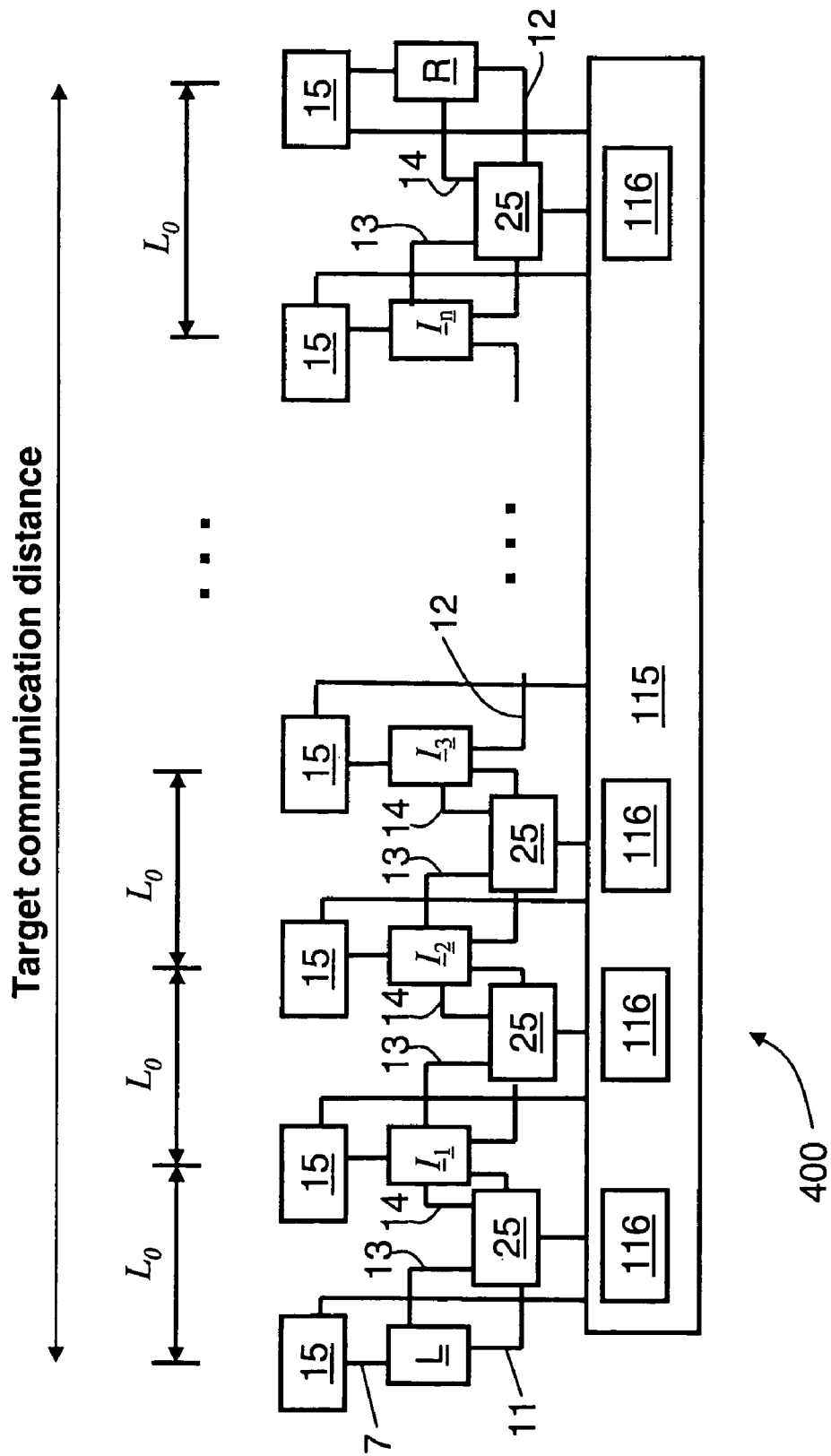
Figure 8:
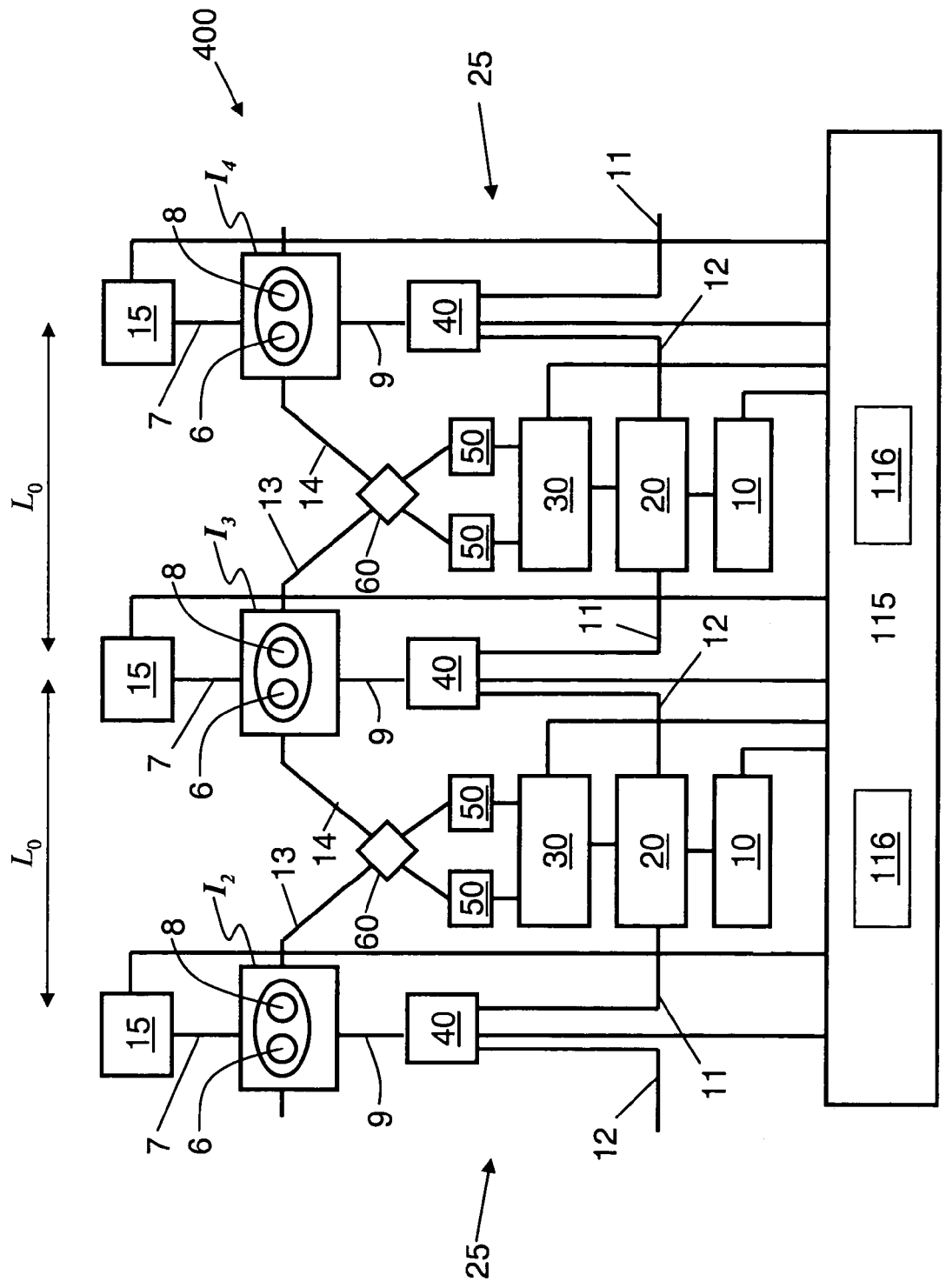
Figure 9:
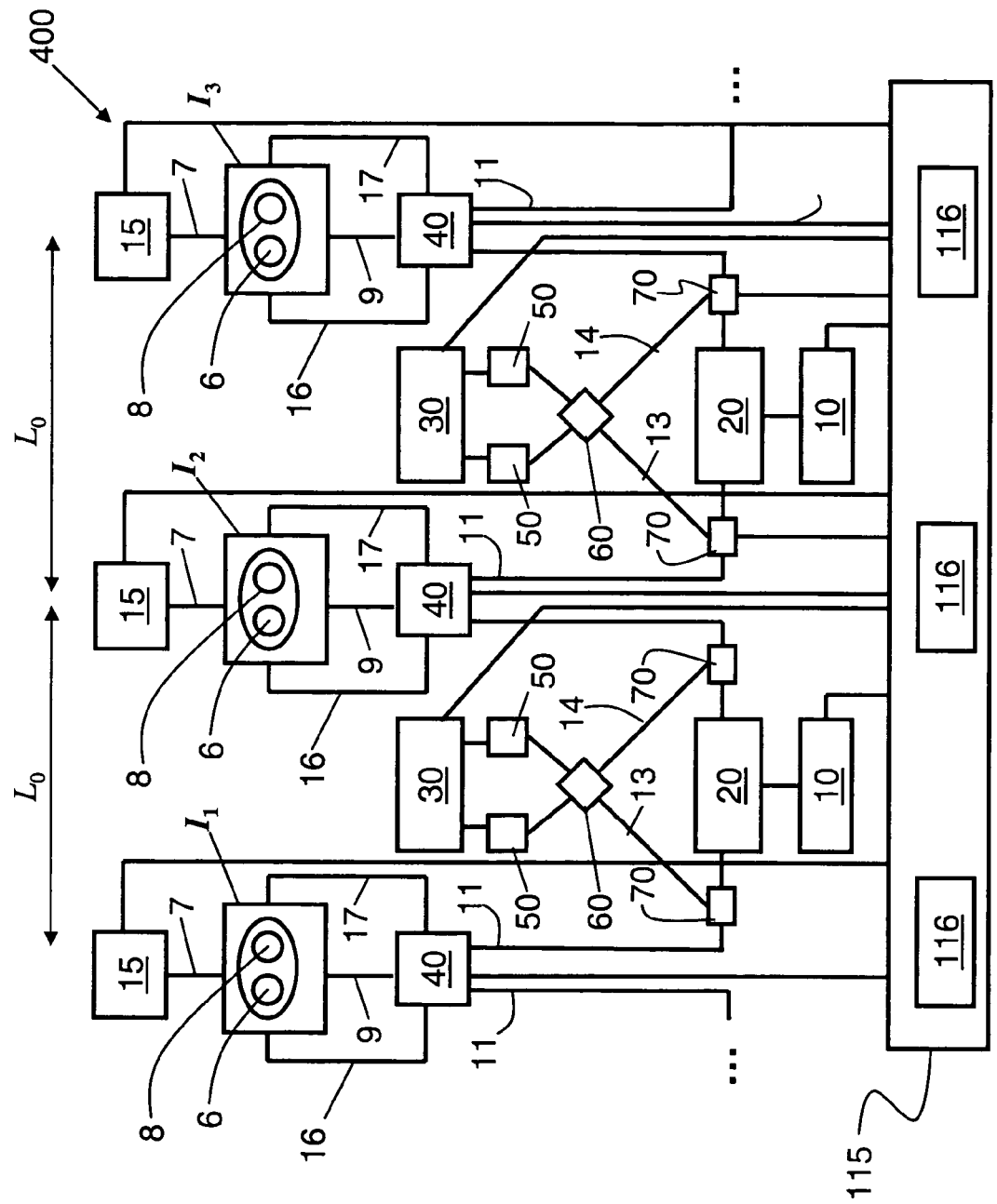

FIG. 7 is a schematic diagram of an example embodiment of a long-distance quantum communication apparatus similar to that of FIG. 1 that uses probabilistic photon-mediated entanglement between remote ions; and FIGS. 8 and 9 are schematic diagrams illustrating respective example embodiments of the long-distance quantum communication apparatus of FIG. 7 for creating photon-mediated entanglement between two remote ions.

DETAILED DESCRIPTION OF VARIOUS EMBODIMENTS

The following description is merely exemplary in nature and is not intended to limit the present disclosure, application, or uses. It should be understood that throughout the drawings, corresponding reference numerals indicate like or corresponding parts and features.

The present teachings relate to apparatus and methods for large-scale quantum computation and for long-distance communication, and is based on the information and principles set forth in the article by B. B. Blinov, D. L. Moehring, L. M. Duan, and C. Monroe, entitled "Observation of entanglement between a single trapped atom and a single photon," *Nature*, vol. 428, 11 Mar. 2004, pp.153-157 (hereinafter, "the Blinov reference"), and in the article by L. M. Duan, B. B. Blinov, D. L. Moehring, and C. Monroe, entitled "Scalable trapped ion quantum computation with a probabilistic ion-photon mapping," published at arXiv:quant-ph/0401020 v1 5 Jan. 2004 (and later published in *Quant Inf. Comp.*, 4, 165 (2004)) (hereinafter, "the Duan reference"), which articles are incorporated herein by reference.

Figure 2:
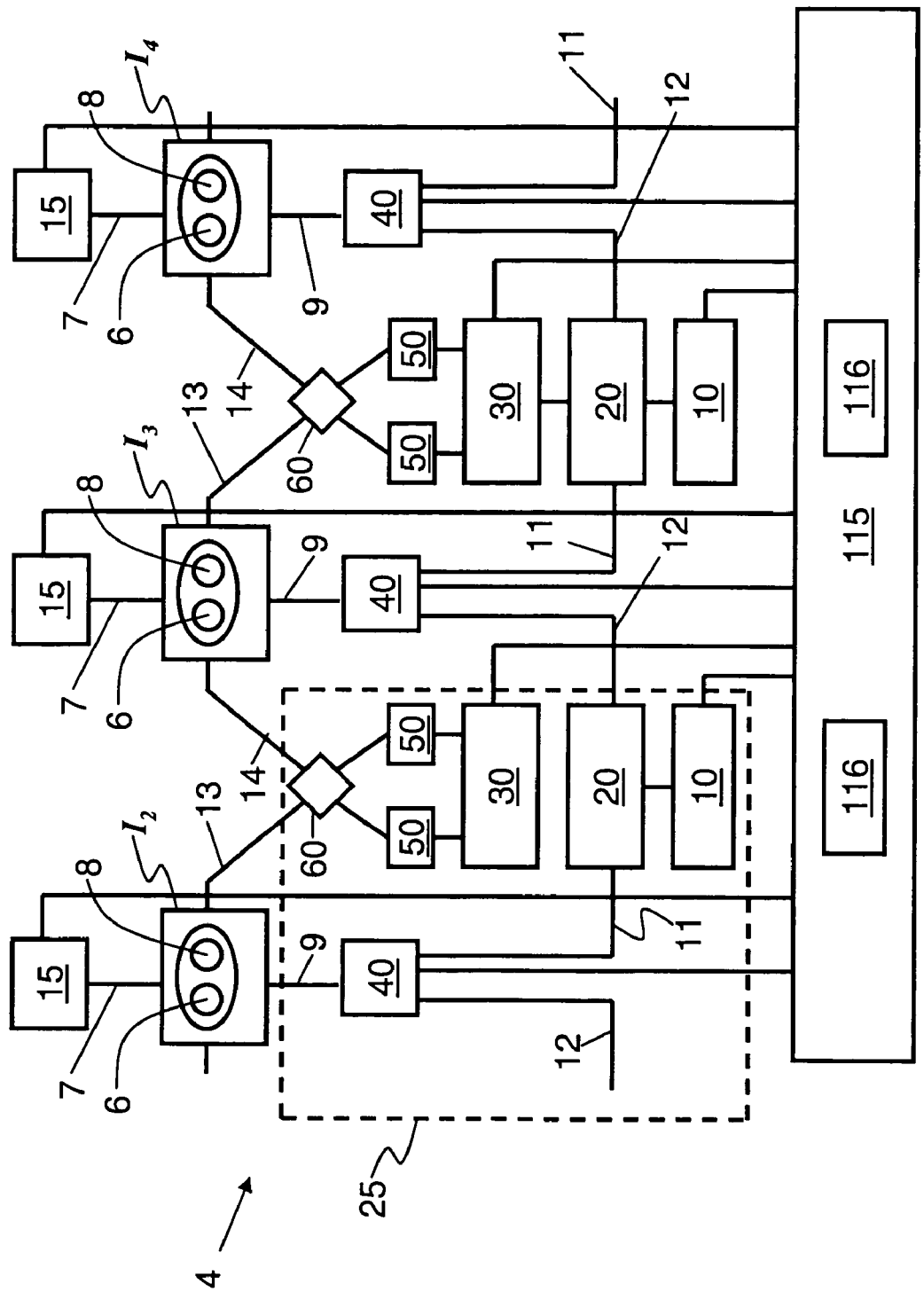
FIG. 2 is a schematic diagram of an example embodiment of the apparatus of FIG. 1, showing details of an example embodiment of the technical block that operably couples adjacent ion traps.

I. Scalable Quantum Computation Using Probabilistic Photon-Mediated Entanglement between Remote Ions FIG. 1 is a schematic diagram of an example embodiment of a quantum computing apparatus 4 for realizing quantum computation using probabilistic photon-mediated entanglement between remote ions. FIG. 2 illustrates in more detail an example embodiment of the apparatus of FIG. 1. The quantum computing apparatus 4 comprises n ion traps $I_i$, i=1, . . . , n that represent n qubits of a quantum register. The number of qubits can be increased as necessary by adding more ion traps. Each trap $I_i$ contains two ions 6 and 8 (not shown in FIG. 1, see FIG. 2): one ion (say, ion 6) is a "logical" qubit and the other (ion 8) is an "ancilla" qubit, which is used to establish entanglement between different remotely located qubits. The ion traps $I_i$ are optically coupled by optical paths 11, 12, 13 and 14 to a technical block 25, which is operably coupled to a controller 115. In an example embodiment, optical paths 11-14 are formed by or otherwise include optical fiber sections.

With reference to FIG. 2, an example embodiment of technical block 25 includes a light source 10, a synchronizer 20 operably coupled to the light source, an optical switch 40 optically coupled to the synchronizer, a beamsplitter 60 optically coupled to adjacent ion traps, two single-photon detectors (SPDs) 50 optically coupled to the beamsplitter, and a photodetector control system 30 operably coupled to the SPDs. Light source 10 may include, for example, a pulser or amplitude modulator (not shown) to convert continuous light to pulsed light. Also, in an example embodiment, optical switch 40 is optically coupled to ion trap via an optical path 9 (e.g., an optical fiber section) and is also operably coupled to and controlled by controller 115. In an example embodiment, optical path 9 is simply an extension of optical path 11 after optical switch 40.

In an example embodiment, SPDs 50 are conventional single-photon detectors capable of detecting light propagating along optical paths 13 and 14 through beamsplitter 60 to the SPDs. Beamsplitter 60 interferes two photons emitted by the ions from adjacent ion traps.

Figure 3:
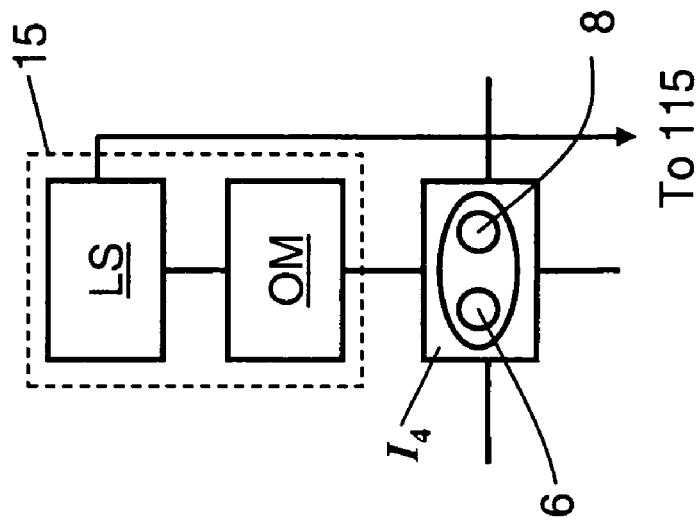
FIG. 3 is a close-up schematic view of the modulator unit that includes a light source and an optical modular operably coupled to an ion trap for performing deterministic local single qubit and two-qubit operations.
Figure 3:
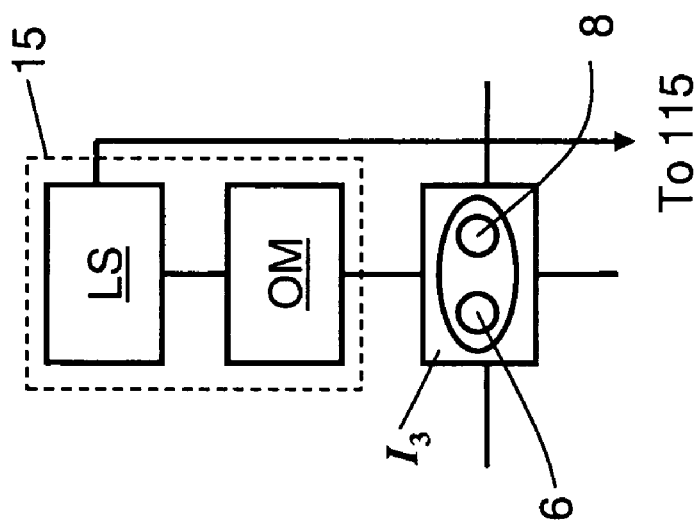
Figure 3:
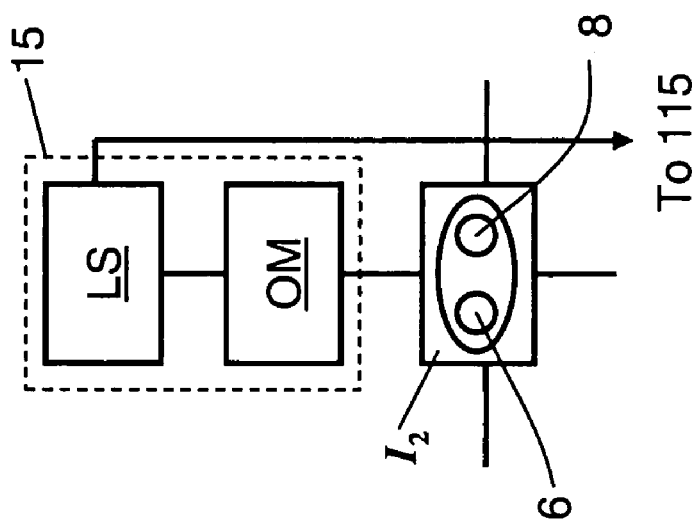

With reference also to FIG. 3, apparatus 4 includes a modulator unit 15 that includes a light source LS and an optical modulator OM, such as an acousto-optical modulator, downstream of the light source. Modulator unit 15 is adapted to provide light pulses to each ion trap $I_i$, via an optical path 7 (e.g., an optical fiber section) in order to apply single-qubit gates and local two-qubit gates at each ion trap.

Additional elements of the apparatus 4 include standard electronics 116 adapted to control the operation of switches 40, SPDs 50, light sources LS and light sources 10, synchronizer 20 (for synchronizing light pulses from the light sources), and optical modulator OM in modulator unit 15 (to control the modulation of light from light source LS). In an example embodiment, the aforementioned standard electronics are included in controller 115, as shown.

Quantum Computing Method

Quantum computing apparatus ("quantum computer") 4 of FIGS. 1 and 2 is used to performing quantum computation by using a large number of ion pairs contained in separate traps. Two or more traps constitute a quantum register. As discussed above, one ion of each pair represents one logical qubit, while the other represents an ancillary qubit used for establishing entanglement between qubits in different traps. Present-day technology presently allows for very good control of each ion pair. Approaches for performing local single-qubit operations are also available and well established.

To have a complete set of quantum gates, one has to find a way to make a two-qubit gate between remote qubits, for example, a CNOT gate. This is done by using a Bell measurement. In fact, the remote quantum CNOT gate is deterministic. Thus, the optically coupled n ion traps $I_i$, i=1, . . . , n use to perform local single- and two-qubit operations and remote CNOT gate operation give a scalable and complete set of universal gates suitable for performing quantum computation using quantum computer 4.

In quantum computer 4 of FIGS. 1 and 2, the quantum register includes the series of ion pairs (6, 8) operably supported in different separated traps $I_t$. Within each pair, one ion (the logic ion 6) encodes the quantum information and the second ion (the ancilla ion 8) allows the coupling to another ion pair through a probabilistic entanglement protocol. This probabilistic entanglement, combined with conventional local motional gates within each pair, allows for an effective quantum gate between the remote logical qubits. The resulting remote operation is deterministic because the probabilistic entanglement operations can be performed off-line so that a failed entangling attempt does not destroy the computational quantum state carried by the logical ions.

To achieve scalability, deterministic quantum gates are formed between two arbitrary logic ions 6 in different pairs. For this purpose, each ancilla ion 8 is coupled to SPDs 50 through its corresponding optical path 13 or 14. To entangle two ancilla ions, say $8i'$ and $8j'$ (hereinafter, simply referred to as i' and j'), both ions are pumped with an appropriate resonant laser beam from technical unit 25 to excite their electronic states. The resulting spontaneously emitted photons from these two ions are directed via optical path 13 or 14 to beamsplitter 60 and to SPDs 50 for a Bell-type collective measurement. For particular measurement results, the two ancilla ions i' and j' are projected into a Bell state, which is denoted as $|\Psi_{i'j'}\rangle = (|01\rangle + |10\rangle)/\sqrt{2}$. Each entangling operation succeeds with probability $p_s$, which is the probability to register the appropriate result. This operation is repeated on average $1/p_s$ times for a final successful confirmation of entanglement. The total preparation time is about $t_c/p_s$, where $t_c$ is the time for each individual entangling operation. Logic and ancilla ions 6 and 8 having sufficient spectral resolution are used so that the probabilistic entangling operation on the ancilla ions does not influence the logic ions, even if this entangling operation fails.

With the assistance of the final Bell state $|\Phi_{i'j'}\rangle$, remote quantum controlled-NOT (CNOT) gates can be achieved on the corresponding logic ions i and j. It is assumed that quantum CNOT gates can be realized on the local ions i, i' and j, j' in the same pairs through conventional means relying on the collective motion of the ions.

Note that all the motional gates work even when the two local ions are of different isotopes or species. These CNOT gates are denoted by $C_{ii'}$ and $C_{jj'}$, where the subscripts refer to the control and target ions (i.e., the logic and ancillary ions). The remote CNOT gate $C_{ij}$ operating on the logic ions i, j is achieved through a combination of the gates $C_{ii'}$, $C_{jj'}$ and the Bell state $|\Phi_{i'j'}\rangle$. This can be seen by considering the following identity gates $$C_{ii'}C_{jj'}(|\Psi\rangle_{ij\ldots} \otimes |\Phi\rangle_{i'j'}) = |0+\rangle_{i'j'} \otimes C_{ij}(|\Psi\rangle_{ij\ldots}) + |0-\rangle_{i'j'} \otimes \sigma_i^z C_{ij}(|\Psi\rangle_{ij\ldots}) + |1+\rangle_{i'j'} \otimes \sigma_j^x C_{ij}(|\Psi\rangle_{ij\ldots}) + |1-\rangle_{i'j'} \otimes (-\sigma_i^z \sigma_j^x) C_{ij}(|\Psi\rangle_{ij\ldots})$$

where $|\pm\rangle_{j'} = (|0\rangle_{j'} \pm |1\rangle_{j'})/\sqrt{2}$, and $|\Psi\rangle_{ij\ldots}$ denotes the computational state, for which the i, j logic ions may be entangled with other logic ions. The single qubit Pauli operators $\sigma_i^z$ and $\sigma_j^x$ act on the corresponding logic ions i, j. The above identity has been implied previously in different contexts, particularly in the discussion of the communication complexity of quantum CNOT gates.

The above identity shows a remote CNOT gate $C_{ij}$ on the logic ions i, j is accomplished by the following acts:

Prepare the ancilla ions i' and j' into the EPR (Einstein-Podolsky-Rosen) state $|\Psi_{i'j'}\rangle$ using a probabilistic entangling protocol. Repeat the protocol until it succeeds.

Apply the local motional CNOT gates $C_{ii'}$ and $C_{jj'}$ on the ions i, i' and j, j' within the same pairs.

Measure the ancilla ion i' in the basis $\{|0\rangle_{i'}, |1\rangle_{i'}\}$ and the ancilla ion j' in the basis $\{|+\rangle_{j'}, |-\rangle_{j'}\}$.

Apply a single bit rotation $\{I, \sigma_i^z, \sigma_j^x, -\sigma_i^z \sigma_j^x\}$ on ion i and/or ion j if the measurement results are $\{0+, 0-, 1+, 1-\}\}$, respectively.

As mentioned above, in an example embodiment the resulting remote quantum CNOT gate $C_{ij}$ is deterministic even though the seeding entangling operations are probabilistic because the probabilistic operation is repeated off-line until it succeeds. When accompanied by simple local single-bit rotations, this computation model is therefore scalable with no fundamental limit to the number of ion pairs in different traps. The essential resources are two-ion local motional gates and remote ion-photon probabilistic entangling operations, both of which have been demonstrated.

Atom-Photon Entanglement

An important aspect of implementing long-distance quantum communication and scalable quantum computation according to the present teachings involves demonstrating entanglement between a single trapped ion and a single photon emitted spontaneously from the ion. The present teachings also include a method of creating atom-photon entanglement, as described herein.

For creating atom-photon entanglement, a single atom trapped in free space is required. This can be accomplished by either trapping an atomic ion in a RF (radio frequency) quadrupole trap, or by trapping a single neutral atom in a dipole trap. The former approach is preferable, as the technology of RF traps is very well developed, and longer atom storage times (up to days and weeks) are possible.

Figure 4:
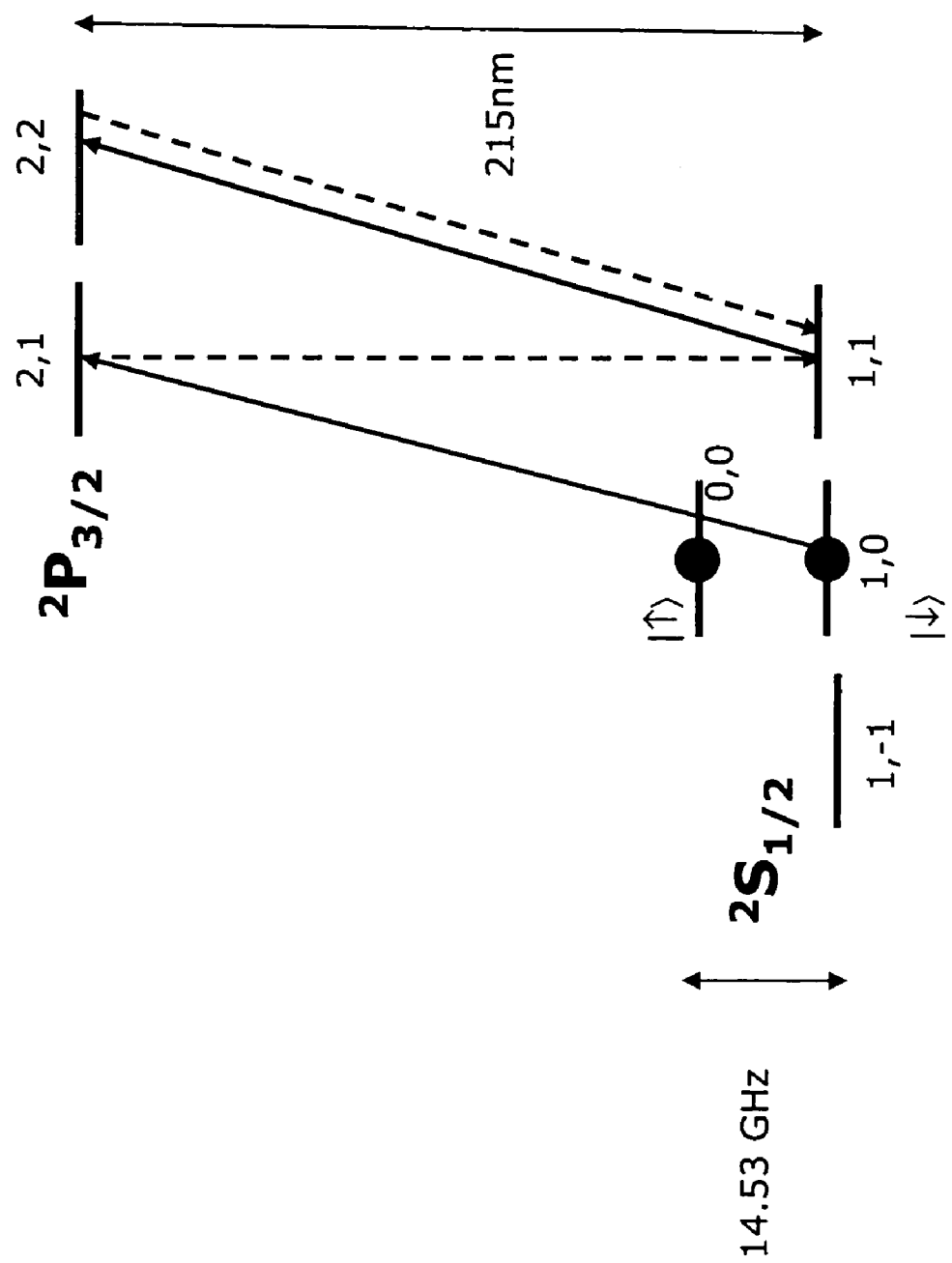
FIG. 4 is an energy level diagram of a $^{111}Cd^+$ atomic ion having a two-level structure that allows the atomic ion to serve as a qubit.

FIG. 4 is an energy level diagram of an atomic ion having a two-level structure (with energy levels S and P) that allows the atomic ion to serve as a qubit. The atomic structure of the trapped atom (ion) must have distinguishable, long-lived (ground or metastable) levels to form a two-level system (qubit). Examples of such atoms (ions) are: Cd+, Be+, Ca+, Ba+, Rb, Cs, etc.

In order for the single-atom/single photon entanglement protocol to work, the atom must also have an excited state in the optical region of the electromagnetic spectrum (e.g., infra-red, visible or ultra-violet), with several possible decay channels to the ground (or the metastable) state. Decays through these channels should proceed with photons of different polarizations being emitted. Then, the polarization of an emitted photon is uniquely correlated with the final internal state of the atom. It can be shown that the polarization state of the photon is entangled with the state of the atom.

Photon Entanglement Apparatus

Figure 5:
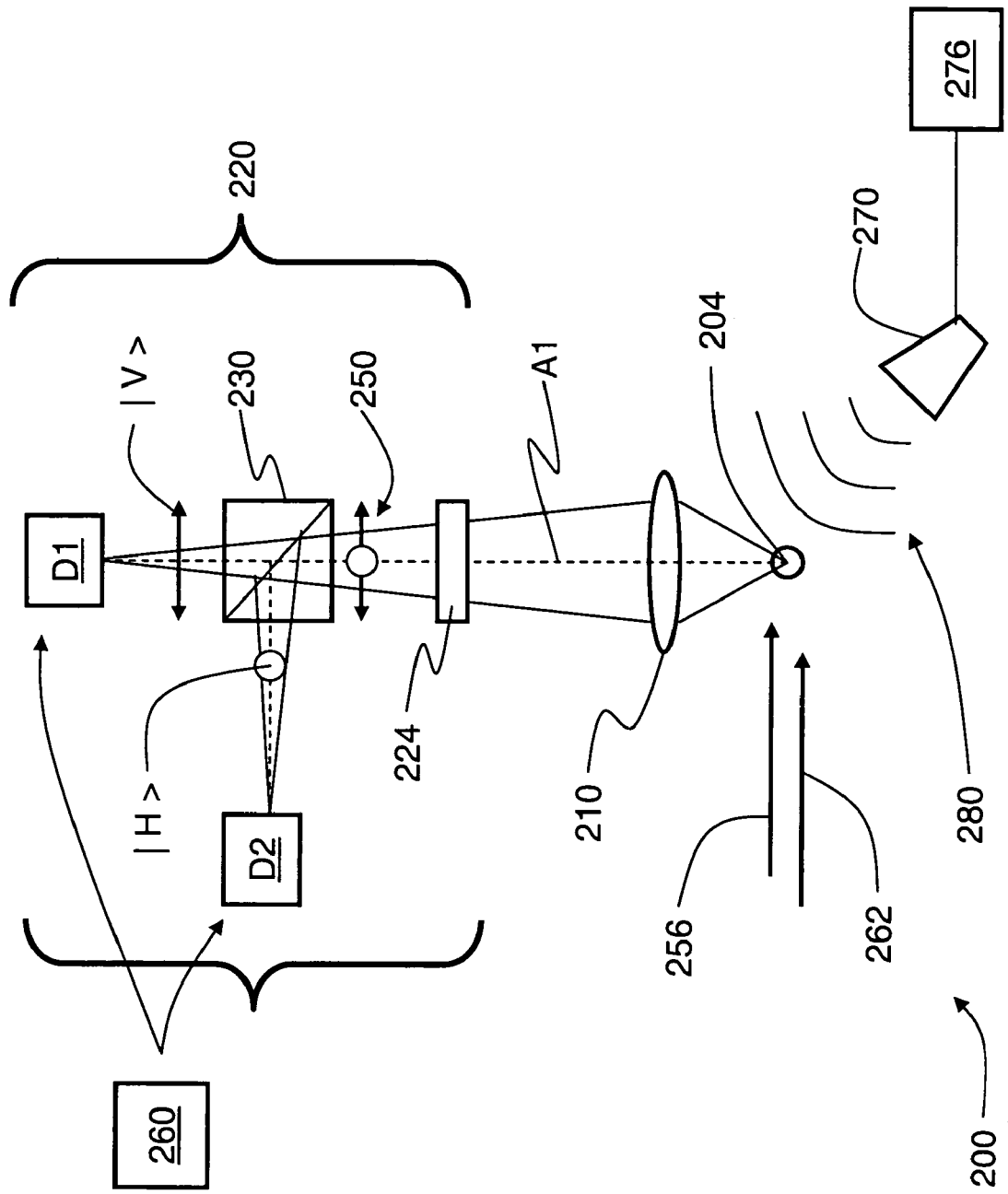
FIG. 5 is a schematic diagram of an example single-atom/single-photon entanglement apparatus according to the present teachings.

FIG. 5 is a schematic diagram of an example embodiment of a single-atom/single-photon entanglement apparatus 200 according to the present teachings. In an example embodiment, apparatus 200 is adapted for use in or is otherwise included in technical block 25 of quantum computing apparatus 4, wherein ion 204 in apparatus 200 represents either logic ion 6 or ancillary ion 8 in one of the ion traps $I_n$. In an example embodiment of the present teachings, apparatus 200 is an RF (Paul) trap.

Apparatus 200 is preferably suited for trapping small numbers of ions and confining them at low temperatures (~1 mK) for long periods of time. The low temperatures can be achieved through Doppler laser cooling with a single excitation laser beam 256 tuned to a strong optical transition in the atom. The same or similar laser can be used for ion qubit state detection with a quantum jump technique, and for initial atom state preparation. For a Cd+111 ion, the lasers need to be tuned near 214.5 nm or 226.5 nm to excite its two lowest excited states.

With continuing reference to FIG. 5, apparatus 200 includes a collection optical system 210 (e.g., a collection lens) arranged along optical axis A1 downstream of atom 204, and a photon-state analyzer (PSA) 220 arranged downstream of collection optical system 210. PSA 220 includes a half-wave ($\lambda$/2) plate 224, and a polarizing beamsplitter 230 arranged downstream of the half-wave plate. Polarizing beamsplitter 230 creates a second optical axis A2 that intersects optical axis A1 at a right angle. PSA 220 further includes two single-photon detectors (SPDs) D1 and D2 arranged along respective optical axes A1 and A2 and downstream of polarizing beamsplitter 230. In an example embodiment, SPDs D1 and D2 are photon-counting photomultiplier tubes.

For optics alignment purposes, as well as for monitoring trapped atom 204, it is important to be able to direct the photons 250 scattered by atom (ion) 204 onto an imaging camera 260. Accordingly, in an example embodiment, apparatus 200 is adapted so that imaging camera 260 can be placed therein and then removed therefrom, e.g., to and from the location of either SPD detector D1 or D2. Alternatively, apparatus 200 is adapted so that the detection of light in apparatus 200 is switchable between SPDs D1 and D2 and imaging camera 260.

Apparatus 200 also includes a microwave source 270 adapted to manipulate the qubit states of atom 204. Microwave source 270 is operably coupled to a controller 276 adapted to precisely control the phase and amplitude of microwaves 280 emitted by the microwave source. Microwaves 280 are used to drive transitions between the hyperfine levels of the atomic ground state. For a Cd+111 ion, the microwave transitions occur near 14.503 GHz.

The $\sigma^+$-polarized light for excitation and detection of the trapped ion state is applied along a quantization axis defined by the B-field of microwaves 280 generated by microwave source 270. The scattered photons 250 are collected by collection optical system 210 and directed to PSA system 220, i.e., through half-wave plate 224 and to polarizing beamsplitter 230. Half-wave plate 224 rotates the photon polarization for photonic qubit measurements in different bases. The two SPDs D1 and D2 respectively register the vertically polarized photons ($|V\rangle$) and the horizontally polarized photons ($|H\rangle$) photons.

Method of Operation of the Photon Entanglement Apparatus

With continuing reference to FIG. 5, single ion 204 is trapped and Doppler-cooled to prepare it in its initial state $|i\rangle$ using optical pumping. The process is monitored with imaging camera 260 and a detection beam 262. Once ion 204 is trapped and cooled, imaging camera 260 is switched or removed so that SPDs D1 and D2 can monitor the photons 250 coming from ion 204.

Figure 6:
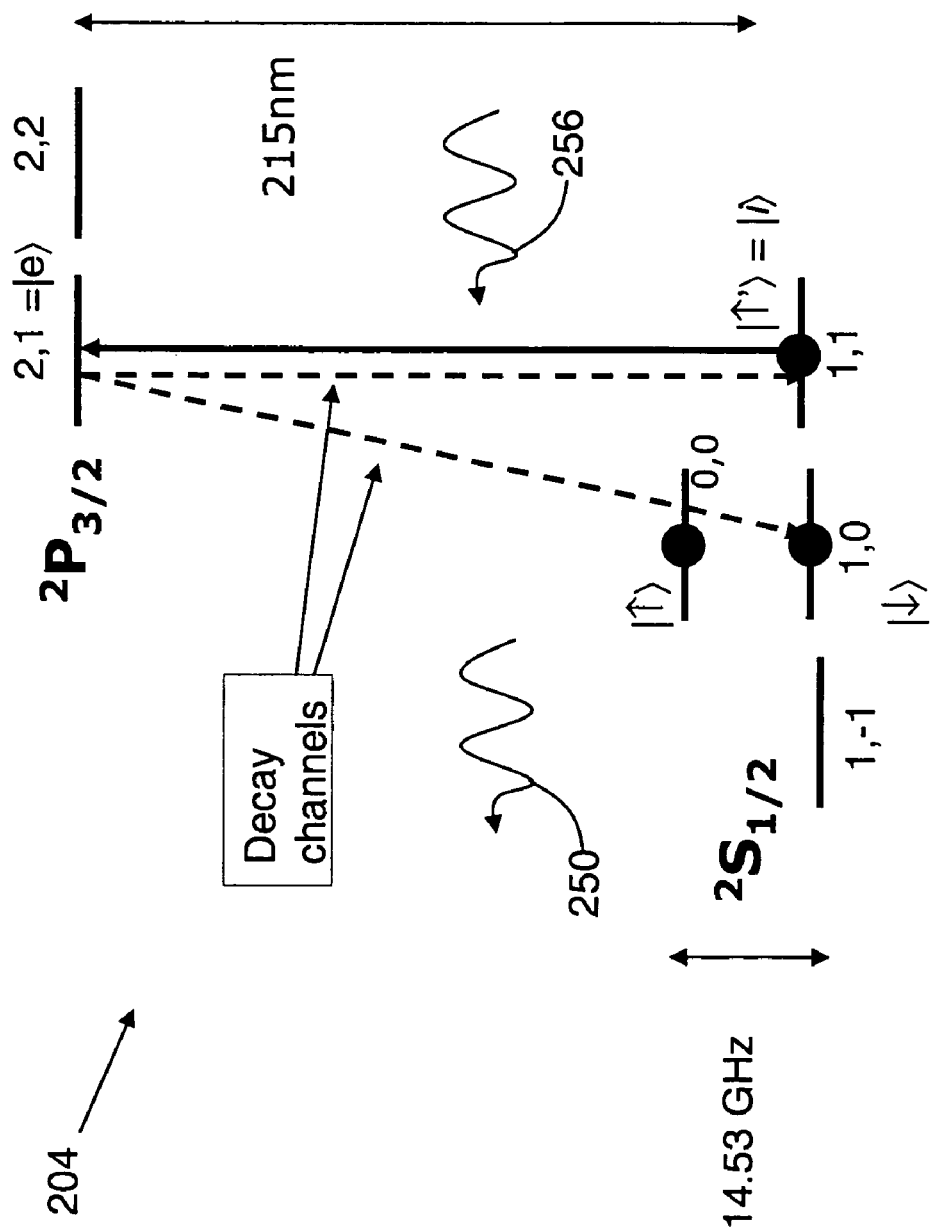
FIG. 6 is the energy level diagram of FIG. 4, but showing the state of the atomic ion after excitation with a laser pulse, and showing the decay channels that result in the emission of a photon.

A short (e.g., ps to ns) excitation pulse from excitation laser beam 256 brings ion 204 to an excited state $|e\rangle$, as illustrated in FIG. 6. The excited state lifetime is typically a few ns, during which the ion decays to the ground state via one of the (two) decay channels. The emitted photon 250 is collected by collection optics 210 with an efficiency defined by its numerical aperture, and PSA 220 analyzes the photon polarization state. Following the photon state detection, the state of the atom is analyzed using microwave rotations and the quantum jump technique.

In more detail, microwaves 280 near 14.53 GHz resonant with the (0,0)-(1,1) transition are applied for the time needed for a pi-pulse. This maps the "temporary" qubit state onto the state of the measurable qubit. Then, if needed, the qubit spanned by the (0,0) and (1,0) states can be rotated by an arbitrary angle on the Bloch sphere by applying microwaves 280 that are resonant with the (0,0)-(1,0) transition. Note that the (0,0)-(1,1) and (0,0)-(1,0) transition frequencies differ by the amount of the Zeeman shift (e.g., a few MHz). The phase of this rotation must be correlated with the single-photon detection time.

The qubit is now ready for detection in an arbitrary basis set by the second microwave rotation. The detection procedure is outlined above.

A typical timing sequence for the above process is as follows:

(1) Doppler-cool, optically-pump: 1 µs (2) Excite pulse: 1 ps-50 ns (3) Detect single photon: 10 ns-60 ns (starts at the beginning of the excite pulse)

If no single photon detected, then return to (1)

-Else- (4) Rotate ion qubit (~10-20 µs for both rotations)

(5) Detect ion qubit (~100-300 µs)

(6) Return to (1)

The results of measuring conditional probabilities in different bases of photon 250 and atom (ion) 204 give clear proof of atom-photon entanglement. This allows generation of entangled states of remotely located trapped ions by performing appropriate coincidence measurements of the emitted photons.

FIGS. 1, 2 and 3, discussed above, are schematic illustrations of example embodiments of quantum computer registers based on ion-trap qubits. Single-qubit operation is implemented locally while entanglement between different qubits is generated by the probabilistic detection of photons.

Cirac-Zoller Controlled-NOT (CNOT) Quantum Gate.

The qubit information is carried by two internal states of each ion. Computational operations are carried out by addressing the ions individually with a laser beam. Single-qubit rotations are performed by using coherent excitation by a single laser pulse driving transitions between the qubit states.

Forming a quantum CNOT gate using common vibration of an ion string (with one ion called the "control ion" while the other is called the "target ion") is accomplished as follows:

prepare ion in the ground state of the common vibration mode;

map the quantum information of the control ion onto the vibrational mode, wherein both ions are moving and the target ion participates in this motion;

invert the target ion's qubit, depending upon its motional state; and map the state of the common mode back onto the control ion. The CNOT gate operation can be described by unitary operation:

$$|00\rangle \quad |01\rangle \quad |10\rangle \quad |11\rangle$$

-continued $$\begin{array}{c} |00\rangle \\ |01\rangle \\ |10\rangle \\ |11\rangle \end{array} \begin{pmatrix} 1 & 0 & 0 & 0 \\ 0 & 1 & 0 & 0 \\ 0 & 0 & 0 & 1 \\ 0 & 0 & 1 & 0 \end{pmatrix}$$

where the input and output states of the qubits $|\alpha_1\alpha_2\rangle$ are encoded by the electronic states of the ions.

An EPR pair or an EPR state or an entangled state of the quantum system combined from two quantum subsystems is the state having the wave function:

$$|\Psi\rangle = \frac{1}{\sqrt{2}}(|0\rangle_1|1\rangle_2 + e^{i\varphi}|1\rangle_1|0\rangle_2)$$

where $|0\rangle_j$ and $|1\rangle_j$ are the wave functions of the subsystems (j=1, 2) and $\varphi$ is the arbitrary phase factor. The important property of the EPR state is that as soon as a measurement on one of the subsystems projects it on the certain state, which can be any normalized superposition of $|0\rangle$ and $|1\rangle$, the other subsystem has to be in the orthogonal state.

Long-Distance Quantum Communication

FIG. 7 is a schematic diagram of an example embodiment of an apparatus 400 for performing long-distance communication using probabilistic photon-mediated entanglement between remote ions. Apparatus 400 of FIG. 7 is similar to apparatus 4 of FIG. 1, and includes two remote end nodes, L and R at opposite ends of n intermediate nodes $I_i$. The actual number of nodes depends on the total distance between end nodes L and R and the attenuation length $L_{at}$ of the photons. Each node is separated from its neighboring node by distance $L_0$, which is less than the photon attenuation length $L_{at}$. Each node includes an ion trap adapted to maintain two ions in the trap and to prepare them in the ground state with a common vibrational mode.

Long-distance communication apparatus 400 has two channels. The first channel is a quantum channel that includes nodes L and R, intermediate nodes $I_i$ (i=1, . . . , n), technical blocks 25 between adjacent nodes, and a transmission channel made up of optical paths 11, 12, 13 and 14 that operatively couple the technical blocks to the nodes. The second channel is a classical channel that provides intermediate control via controller 115 coupled to each technical block 25. The quantum channel may include separate or common pump and signal paths, as shown in FIG. 8 and FIG. 9, and as discussed below.

In an example embodiment, technical block 25 is configured as shown in FIG. 9 to include additional optical switches 70 on either side of synchronizer 20. Optical switches 70 are optically coupled to synchronizer 20, as well as to respective optical switches 40 via respective optical fiber paths (sections) 11. Optical switches 40 are in turn optically coupled to ion trap $I_n$ via optical transmission paths 16 and 17. This arrangement allows for the use of channel (path) 11 for the pump path and the signal path. That is, for pumping, light source 10 sends light pulses through synchronizer 20, through switch 70, over path 11, through switch 40 and over path 9 to the ions 6 and 8 in the traps. For signal (photon) detection, spontaneously emitted photons from ancillary ions 6 are collected by optical path 16 or 17 (depending on the particular trap) and are coupled into optical path 11 at optical switch 40.

The photons travels to respective switches 70, which is activated (via controller 115) to redirect the emitted photons to beamsplitter 60, which interferes the photons and passes them on to SPDs 50.

In an example embodiment, controller 115 controls optical switches 40 and 70. Source 10 may include a pulser or amplitude modulator to convert continuous light to pulsed light. Synchronizer 20 may include electronics for synchronizing laser pulses and/or the beamsplitter. Source 10 emits either continuous light or pulses of light.

In an example embodiment, beamsplitter 60 is preferably a mirror that provides 50% incident intensity reflection and transmission. In alternative embodiments, a 50:50 fiber coupler may replace beamsplitter 60. Also, SPDs 50 are any one of a number of commercially available single-photon detectors capable of detecting light propagated along paths 13, 14 from beamsplitter 60, which provides for interference of the two photons emitted by the ions from adjacent ion traps.

The logical ion 6 and the ancilla ion 8 contained in each ion Trap $I_i$ represent one qubit. Two ions can be tightly confined in a trap and be prepared in an entangled state by applying local motional quantum gates between them. As discussed above in connection with FIGS. 2 and 3, this is accomplished by modulator unit 15.

Method of Operation

With reference again to FIGS. 7, 8 and 9 and apparatus 400 therein, after preparing the ion pair of the end ion-trap L in an entangled state, source 10 generates synchronized laser pulses that propagate along paths 11 and 12 into the ion traps L and $I_1$. These pulses excite one ion in each trap. Spontaneously emitted light (photons) from the de-excitation of these two ions is directed along the above-described optical paths to SPDs 50 for a Bell-type collective measurement. As soon as the detection block (i.e., SPDs 50) registers a photon, the two remote ions are in the entangled state.

The same procedure is applied sequentially to the next segments in the communication apparatus, that is, between traps $I_1$ and $I_2$, and so on. A local collective Bell measurement on the two ions in the intermediate traps is applied to connect the segments. The combination of a motional CNOT gate and individual-ion detections achieves the desired collective measurement. This results in the preparation of the entangled state between logical ions 6 in ion traps L and R.

Scalable Quantum Networks

In an example embodiment of the present teachings, the long-distance quantum communication apparatus 400 as described above is used to realize a scalable quantum network. The basic problem in quantum networking is to transmit quantum states over large distances by overcoming the limit set by the photon attenuation length. Typically, if a single-photon pulse is sent directly through an optical channel, then the efficiency (i.e., the probability that the photon is not absorbed) will degrade exponentially with distance due to photon attenuation. One way to overcome this obstacle is based on quantum repeaters. Implementation of quantum repeaters based on the use of atomic ensembles for storage of quantum entanglement has been proposed by L. M. Duan, M. D. Lukin, J. I. Cirac, and P. Zoller, in their article, "Long-distance quantum communication with atomic ensembles and linear optics," *Nature*, 414, 413 (2001). Following this scheme, some interesting first-step experiments have been recently reported. The quantum repeater can also be realized in the present context with pairs of ions as discussed above. FIGS. 7, 8, and 9 illustrate schematically the implementation of quantum repeaters with the above-discussed paired-ion apparatus 400.

With the probabilistic entangling protocol, entanglement can be created between two nodes, say i and k, and also k' and j', each with a communication distance $L_0$, which is smaller or comparable to the photon attenuation length $L_{at}$. The success probability for preparation of each segment of entanglement is given by $p_{sc}=p_s p_c$, where $p_s$ is the inherent success probability of the entangling protocol, and $p_c=e^{-\alpha L_0}$ is the photon attenuation in the channel. These two segments of entanglement can be connected to generate an entangled state between i and j' through a local collective Bell measurement on the two ions k and k' in the same pair. A combination of a motional CNOT gate and individual ion detections achieves the desired collective measurement. The preparation time for each segment of entanglement is $T_{sc}=t_c/p_{sc}$ and the time for establishing entanglement between the next neighboring nodes i and j (with a distance $2L_0$) is simply estimated by $T_2=2TC_{sc}$ if each segment of entanglement is sequentially prepared. The time required for establishing entanglement over n segments with a total communication distance of n $L_0$ is estimated by $T_n=nT_{sc}=ne^{\alpha L_0}(t_c/p_s)$ with the ion-based quantum repeaters. Here, local motional gate errors and ion detection inefficiency are neglected because they are typically small compared to errors from the photon attenuation and the inherent inefficiency of the entangling protocol. This linear scaling of the communication time compares favorably with the exponential scaling law $T_n=e^{n\alpha L_0}(t_c/p_s)$ for the case of direct communication without repeaters.

Preferred Transmission Wavelengths

In an example embodiment, ions with transition wavelengths compatible with available optical fibers are employed in the present teachings. Presently available ions traps that provide such emission wavelengths are Yb (Ytterbium) with a P1/2-D3/2 transition at ~3.6 micron; Sr (Strontium) with a P1/2-D3/2 at 1092 nm; Ca (Calcium) with a P1/2-D3/2 at 866 nm; and Ba with an S1/2-D5/2 transition at 1760 nm.

It will be apparent to those skilled in the art that various modifications and variations can be made to the present teachings without departing from the spirit and scope of the present teachings. Thus, it is intended that the present teachings cover the modifications and variations of these teachings provided they come within the scope of the appended claims and their equivalents.

What is claimed is:

1. A method of creating entanglement between remotely located ions, comprising:
    trapping pairs of logic and ancilla ions in respective first and second remote ion traps;
    entangling the logic and ancilla ions in each trap;
    causing the ancilla ions in each ion trap to emit photons; and
    interfering and detecting the emitted photons to establish entanglement between the logic ions of the first and second ion traps.

2. The method of claim 1, including preparing all of the ions in a ground state using laser cooling and optical pumping.

3. A method of forming a quantum register, comprising:
    a) providing two or more optically coupled ion traps that each contain a pair of ions, with one ion serving as a logical qubit and the other ion serving as an ancilla qubit;
    b) optically exciting the ancilla qubits in adjacent traps; and
    c) interfering and detecting spontaneously emitted light from the excited ancilla qubits to cause the logical qubits in the adjacent ion traps to become entangled.

4. The method of claim 3, wherein the ion traps include first and second end traps that surround intermediate ion traps, and including:
    i) repeating acts b) and c) for adjacent ion traps in sequence; and
    ii) making a Bell measurement of the ancilla qubits in the intermediate traps in sequence so as to cause entanglement between logic qubits in the first and second end traps.

5. The method of claim 4, wherein making the Bell measurement includes:
    a) exciting each ancilla ion in the intermediate traps from an initial state to a decaying state using a weak laser pulse; and
    b) measuring a fluorescence from the decaying state to determine a population of the initial state.

6. A method of establishing entanglement between ions in a quantum network, comprising:
    a) preparing trapped logic and ancilla ions in a ground state in each of a plurality of optically coupled remote ion traps in the network;
    b) entangling the logic and ancilla ions in a first one of the ion traps by applying a local motional CNOT gate; and
    c) performing a probabilistic photon-mediated entanglement protocol using the ancilla ions to establish entanglement between the logic ions in the first ion trap and an adjacent second ion trap in the network.

7. The method of claim 6, wherein the ion traps include a third ion trap adjacent the second ion trap, and further including repeating acts b) and c) for the second and third ion traps to establish entanglement between the logic ions in the first and third ion traps.

8. The method of claim 6, wherein the ion traps include n ion traps, and wherein the method further includes repeating acts b) and c) from the second ion trap to the $n^{th}$ ion trap sequentially to establish entanglement between logic ions in the first ion trap and the $n^{th}$ ion trap.

9. The method of claim 8, including:
    transferring information from the logical ion in the first ion trap to the logical ion in the $n^{th}$ ion trap by preparing a wave function of the logical ion in the first ion trap in a coherent superposition.

10. The method of claim 9, wherein preparing the wave function includes providing light pulses to the logical ion in the first ion trap.

11. A quantum system capable of quantum computing or long-distance quantum communication, comprising:
    a plurality of optically coupled ion traps each containing a logic ion and an ancilla ion;
    means for applying a local motional CNOT gate on each pair of ancilla and logic ions in each ion trap so as to establish entanglement between said logic and ancilla ions; and
    means for establishing probabilistic photon-mediated entanglement between the ancilla ions in each ion trap so as to establish entanglement between the logic ions in each ion trap.

12. A long-distance quantum network system, comprising:
    a number of remotely located nodes, including a first and a last node, with each node containing an ion trap that contains a pair of trapped logic and ancilla ions, wherein the nodes are separated by a distance less than an attenuation length of photons emitted by the trapped ions, wherein each ion trap is optically coupled to:
    a) a laser cooling and optical pumping system adapted to prepare the ions in each trap in a ground state of a common vibrational mode;

b) a technical block adapted to excite the ancilla ions;

c) an optical detection system adapted to interfere and detect photons emitted by excited ancilla ions from adjacent ion traps; and d) a modulator unit adapted to provide light pulses to the logic ion, or to both the logic ion and the ancilla ion, in order to form single-qubit gates or local two-qubit gates at the corresponding ion trap.

13. The system of claim 12, further including optical fiber paths arranged to transmit excitation light to the ion traps, and to transmit the photons emitted by the excited ancilla ions to the corresponding optical detection system.

14. The system of claim 12, wherein the technical block includes a light source, a synchronizer operably coupled to the light source, and an optical switch operably coupled to the synchronizer and to adjacent ion traps.

15. The system of claim 12, wherein the optical detection system includes a beamsplitter optically coupled to adjacent ion traps, a pair of photodetectors optically coupled to a beamsplitter, and a photodetector control system operably coupled to the photodetectors.

16. The system of claim 12, wherein the modulator unit includes a light source and an optical modulator optically coupled to the light source.

\* \* \* \* \*

UNITED STATES PATENT AND TRADEMARK OFFICE
CERTIFICATE OF CORRECTION

PATENT NO. : 7,518,120 B2  Page 1 of 1
APPLICATION NO. : 11/324366
DATED : April 14, 2009
INVENTOR(S) : Christopher Monroe et al.

It is certified that error appears in the above-identified patent and that said Letters Patent is hereby corrected as shown below:

Column 5, lines 55-57, all occurrences of "⊕" should be --⊗--.

Column 5, lines 55-57, all occurrences of "..̣" should be --̣-.

Column 5, line 59, "..̣" should be --̣--.

Column 11, line 16, "$2TC_{sc}$" should be --$2T_{sc}$--.

Column 11, line 26, "$e^{n\alpha l}{}_0$" should be -- $e^{n\alpha L}{}_0$--.

Signed and Sealed this

Seventeenth Day of November, 2009

David J. Kappos
*Director of the United States Patent and Trademark Office*